Aug. 30, 1949.　　　　C. R. HANNA ET AL　　　　2,480,574
GYRO-CONTROLLED SERVOMOTOR SYSTEM
Filed June 7, 1945　　　　　　　　　　　　　3 Sheets-Sheet 1

INVENTORS
CLINTON R. HANNA,
LAWRENCE B. LYNN.
BY
ATTORNEY

Aug. 30, 1949. C. R. HANNA ET AL 2,480,574
GYRO-CONTROLLED SERVOMOTOR SYSTEM
Filed June 7, 1945 3 Sheets-Sheet 2

INVENTORS
CLINTON R. HANNA,
LAWRENCE B. LYNN.
BY
ATTORNEY

Aug. 30, 1949.                C. R. HANNA ET AL                2,480,574
                          GYRO-CONTROLLED SERVOMOTOR SYSTEM
Filed June 7, 1945                                            3 Sheets-Sheet 3
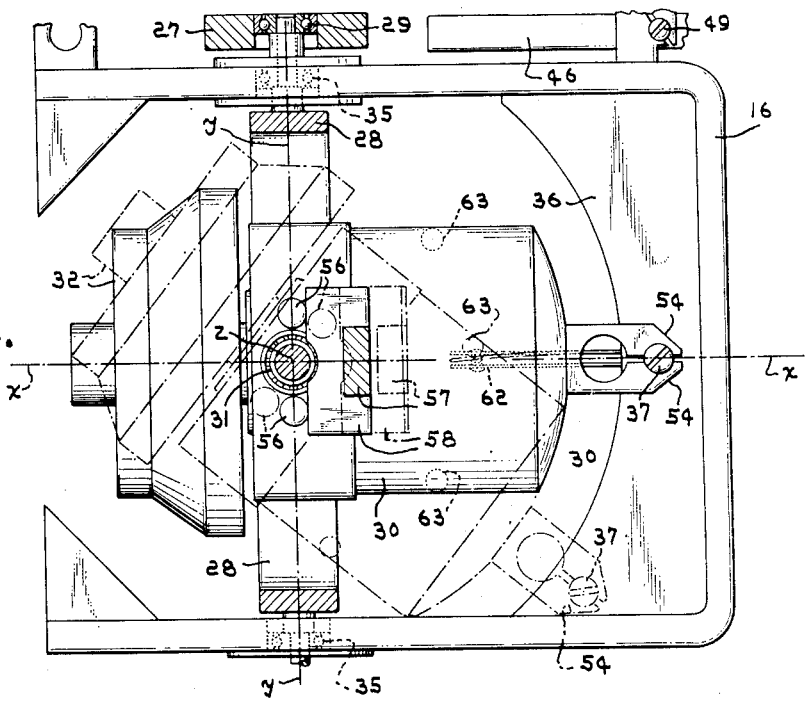
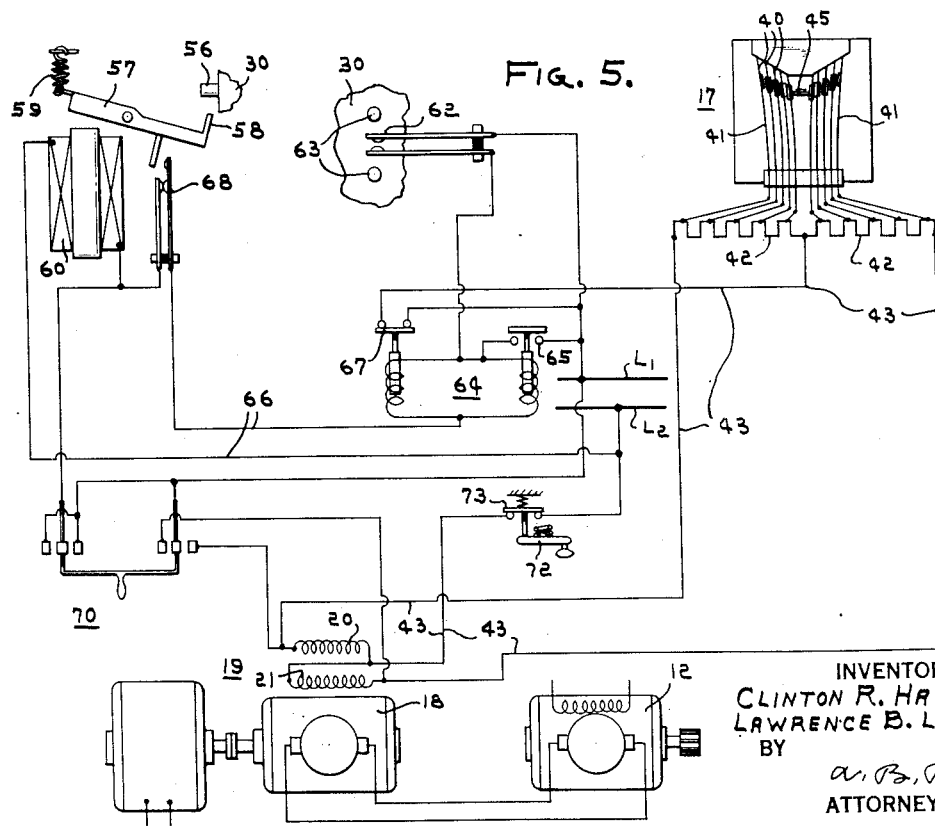
INVENTORS
CLINTON R. HANNA,
LAWRENCE B. LYNN.
BY
ATTORNEY Patented Aug. 30, 1949

2,480,574

UNITED STATES PATENT OFFICE 2,480,574

GYRO-CONTROLLED SERVOMOTOR SYSTEM

Clinton R. Hanna, Pittsburgh, and Lawrence B. Lynn, Wilkinsburg, Pa., assignors to Westinghouse Electric Corporation, East Pittsburgh, Pa., a corporation of Pennsylvania Application June 7, 1945, Serial No. 598,132

6 Claims. (Cl. 318—18)

The invention relates to a servo-motor system for positioning a body member about a mounting axis and it has for an object to provide apparatus of this character wherein the motor of the system is controlled by pick-off means actuated by a member which is positioned by means of a neutral gyro about an axis of the latter extending transversely of the spin axis.

A further object of the invention is to provide pick-off means controlled by a neutral gyro having torque and precession axes with a torque member pivoted about the torque axis and connected to the gyro by a coupling effective about the torque axis, the torque axis extending transversely of the rotor spin axis and the precession axis being normal both to the torque axis and to the spin axis and the coupling between the torque member and the gyro being comprised by surfaces which are engageable for torque transmission about the torque axis and for the development of friction effective about the precession axis to damp precessional oscillations.

Where a gun or the like is mounted on a body member, such as a turret or mounting movable in azimuth, it is desirable to effect stabilization of the gun or the like in azimuth in order automatically to train the gun to keep the latter on the target, irrespective of turning of the supporting structure upon which the turret or body member is mounted. In accordance with the present invention, the azimuth mounting for the gun or the like has its power means under control of means operating in response to deviation of the mounting or turret in azimuth with respect to a reference plane provided by a gyro in order to minimize the deviation, the mounting being moved angularly about the azimuth axis substantially to the same extent as the supporting structure moves angularly about such axis, but in the opposite direction, with the result that the mounting or turret has its angular position about the mounting axis substantially maintained in relation to space. To provide for stabilization in any position in azimuth, the gyro is connected to the mounting or turret by means of gearing which may be manually operated to adjust the azimuth relation of the reference plane and the mounting or turret. As the gyro is a neutral one, as the effort required thereof to maintain the reference plane involves precessional movement about the precession axis, and as it acts most effectively to maintain the reference plane with the spin axis in central position or normal to the torque axis, it is desirable to provide means for positively limiting the extent of precessional movement and for automatically returning the gyro to centered position. Therefore, stops are provided for limiting the extent of precessional movement; and, as each stop is approached, a limit switch is engaged to effect automatic operation of caging mechanism to restore the gyro to centered position, the switch operating a relay to render the caging mechanism effective and to interrupt control of the power means by the gyro. As the gyro is restored to central position, centering switch means becomes effective to operate the relay to restore the caging mechanism to ineffective position and to restore control of the power means to the gyro.

A further object of the invention is to provide improved caging mechanism for a gyro of the above character and which is automatically operative to restore the gyro to a position with its spin axis centered or normal to the torque axis.

Another object of the invention is to provide the aforesaid gyro with stop means effective to limit positively the extent of precessional movement thereof, with caging mechanism operative to center the gyro, and with means responsive to precessional movements of the gyro as the stop means are approached to render the caging mechanism effective and to interrupt control of the power means by the gyro and responsive to movement of the gyro to centered position to restore the caging mechanism to ineffective position and to restore control of the power means to the gyro.

A further object of the invention is to provide apparatus of the character aforesaid wherein the coupling between the body member and the gyro includes leaf spring contacts which are engaged and disengaged in response to movement of the body member about its mounting axis and relative to the gyro reference plane, and wherein there is provided spring means operative to apply force which increases as the leaf spring force resisting deflection increases and which opposes the leaf spring force to neutralize to a substantial extent the movement of the latter acting on the gyro about the torque axis.

A further object of the invention is to provide a gyro coupled to a torque arm which operates variable means against resisting force and wherein coupling is effected by surfaces formed to accommodate precessional movements and which are engageable to damp precessional oscillations or movements and due particularly to torques applied to the gyro because of the resisting force of the variable means.

These and other objects are effected by the invention as will be apparent from the following description and claims taken in connection with the accompanying drawings, forming a part of this application, in which:

Fig. 4 is a detail view of the gyro illustrating an aspect of caging; and

Fig. 5 is a diagrammatic view showing the system controlled by the gyro.

Figure 1:
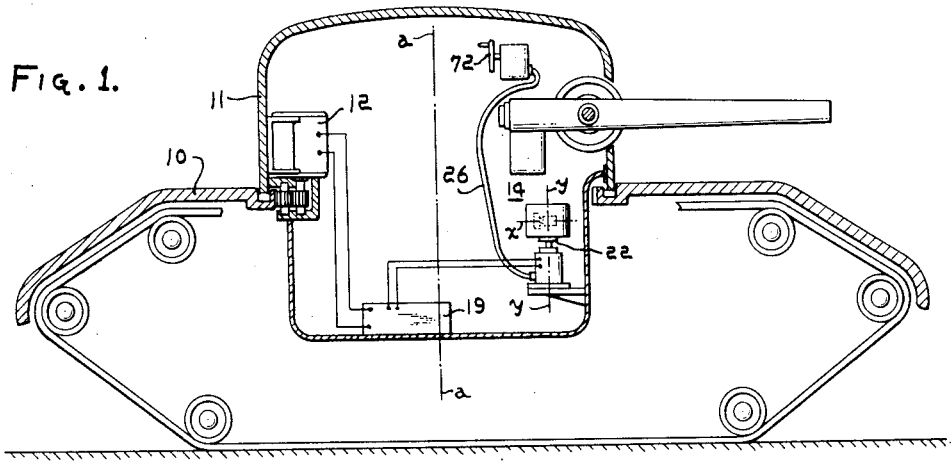
Fig. 1 is a diagrammatic view of structure having the improved stabilizer applied thereto.
Figure 2:
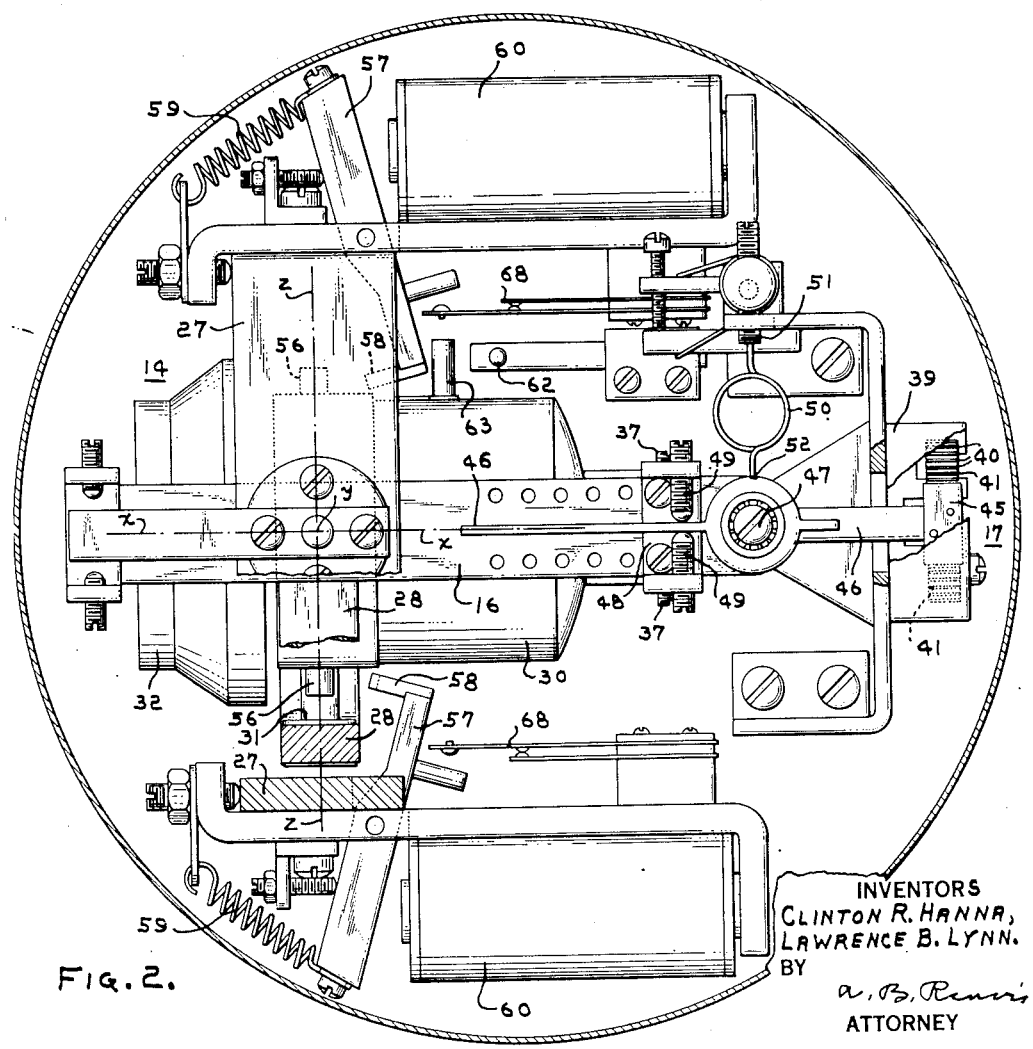
Fig. 2 is an enlarged plan view of the gyro with parts in section.
Figure 3:
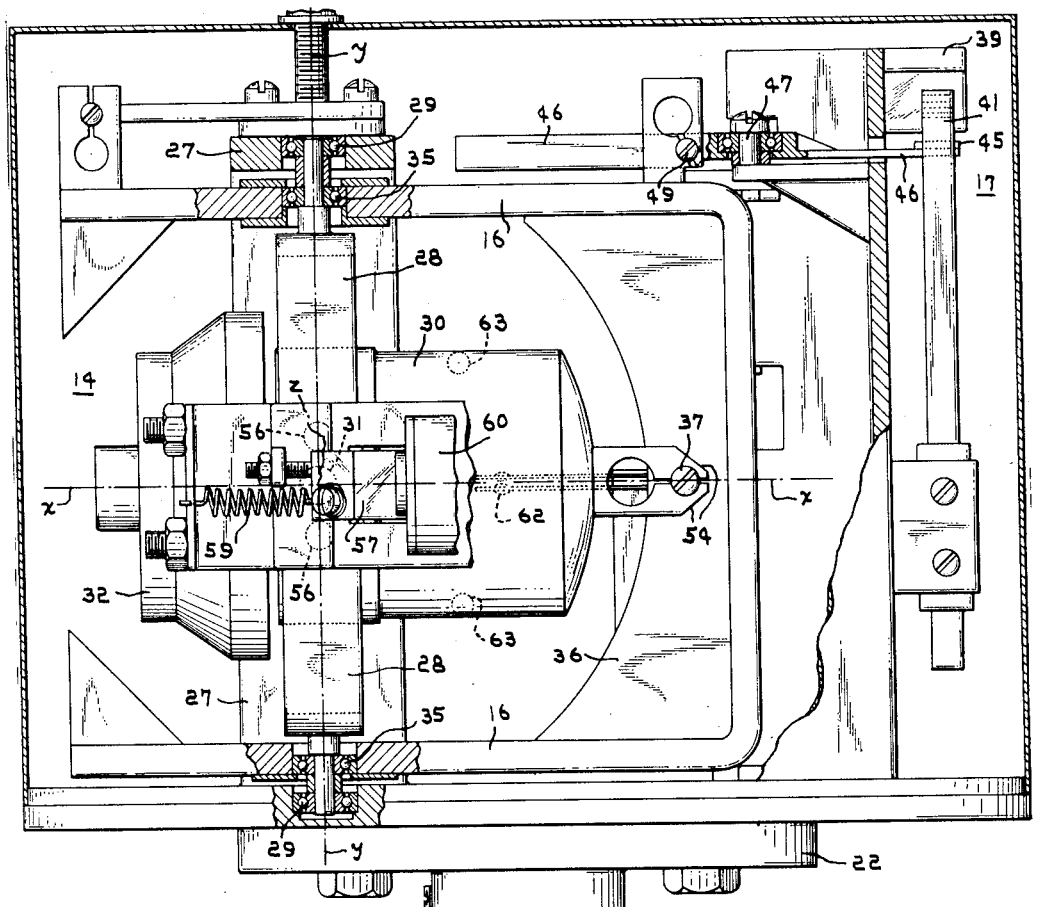
Fig. 3 is a view partly in side elevation and partly in section of the gyro.

In Fig. 1, there is shown movable structure 10, such as the body of a tank or the deck of a ship. A turret or mounting member 11 is pivotally mounted on the supporting structure about the azimuth axis $a$—$a$. Motor means 12 is carried by the turret or mounting member and it is operatively connected to suitable gearing to effect traversing about the mounting or azimuth axis. A gyro, at 14, operates to provide a reference plane used to control the motor 12 to drive the turret to minimize angular deviation of the turret in azimuth and to return the turret to a position in azimuth fixed by the reference plane in the event of departure therefrom.

The gyro, at 14, is a neutral one and it has a torque axis $y$—$y$ extending transversely of the rotor spin axis $x$—$x$ and a precession axis $z$—$z$ at right angles both to the torque axis and to the spin axis. The torque axis $y$—$y$ is parallel to or coincident with the mounting axis $a$—$a$. As the gyro is free to precess about the axis $z$—$z$, precession results in the development of a gyroscopic torque about the axis $y$—$y$, with the result that the plane of the axes $y$—$y$ and $x$—$x$ is held in relation to space and serves as the reference plane for operation of the stabilizer as hereinafter pointed out.

As the neutral gyro maintains the reference plane with respect to space, it is necessary, if the motor means 12 is to be controlled to minimize deviation of the turret or body member therefrom, to employ suitable pick-off apparatus subject to angular movement of the turret or body member relative to the reference plane to control the motor means. Preferably, the pick-off operation is performed by a torque member 16 coupled to the gyro about the torque axis $y$—$y$ and cooperating with variable pick-off means, at 17, carried by the body member or turret and operated in response to angular movement of the latter relative to the torque or lever member 16.

While the motor means 12 used to drive the body member or turret to control its position about the mounting axis may be of any suitable type, there is shown a direct-current motor supplied by a generator 18 of the motor-generator set, at 19, the generator having its output voltage varied by field elements 20 and 21 in response to operation of the variable means.

The gyro is carried by a mounting member 22 having a pedestal 23 pivotally connected to the body member or turret about an axis parallel to or coincident with the azimuth axis $a$—$a$, the purpose of the pivotal connection being to provide a supporting structure which may be adjusted angularly relative to the body member or turret and relative to the mounting axis. Accordingly, the mounting member is connected to the body member or turret to move angularly with the latter by means operative to provide for such adjustment, the means preferably including a worm wheel 24 connected to the pedestal and meshing with a worm 25 operated manually by means of a flexible shaft 26.

More particularly, the gyro, at 14, includes an outer frame 27 attached to the mounting member 22 to constitute, with the latter, an outer frame structure. A gimbal ring 28 is pivotally supported from the outer frame structure by means of upper and lower bearings 29, 29 coaxial with the gyro torque axis $y$—$y$. The inner frame 30 is pivotally supported from the gimbal ring by means of bearings 31, 31 about the precession axis $z$—$z$. A gyro rotor 32 is journaled in the inner frame 30 about the spin axis $x$—$x$. If torque is applied about the axis $y$—$y$, precession occurs about the axis $z$—$z$ and the precessional velocity is accompanied by gyro or reaction torque opposing the applied torque; and, it is because of gyro reaction that the gyro operates to set up the reference plane defined by the torque and spin axes and this operating property is used to control the variable means to drive the power means or motor to return the body member or turret to a predetermined position about the mounting axis and relative to the reference plane in the event of departure from such position.

To enable the gyro to be used for controlling purposes in the manner just indicated, the torque member 16 is coupled to the gyro about the torque axis in such manner that the latter is free to move about the precession axis. The torque or lever member 16 is pivotally suported from the outer frame structure by bearings 35, 35 coaxial with the torque axis; and, as shown, such torque or lever member is of bifurcated or yoke form. Preferably, the coupling between the torque or lever member 16 and the inner frame of the gyro is comprised by a plate element 36 carried by the torque or lever member and having opposed surfaces parallel to the torque axis $y$—$y$ and shoes 37, 37 are carried by the inner frame and cooperate with the surfaces. The plate element and the shoes constitute a coupling between the lever member and the inner frame to provide a torque connection therebetween about the axis $y$—$y$; and as the plate element surfaces are parallel to the torque axis $y$—$y$ or normal to the precession axis $z$—$z$, the coupling provides for precession about the axis $z$—$z$ in response to torque applied to the gyro through the coupling to create gyroscopic reaction torque opposing the applied torque and, therefore, any tendency of the lever member or yoke to move relative to space and about the axis $y$—$y$.

The plate surfaces and the shoes also cooperate to damp precessional oscillations for the reason that gyroscopic action is responsible for the application of normal force engaging the shoes and the surfaces to develop damping friction about the precession axis and which friction is proportional to precessional velocity. The friction damper just described is particularly desirable where the variable means, at 17, is of such a character as to inherently involve application of torque to the gyro because of spring resistance.

The torque or lever member cooperates with variable means so that the latter is operated in response to movement of the body member about the mounting axis and relative to the reference plane defined by the torque and spin axes of the gyro to control the power means to drive the body member or turret so as to minimize deviation, the power means operating to move the body member and the outer frame structure until the variable means is restored to its original condition. As shown, the outer frame structure has a standard 39 upon which there is mounted self-opening leaf spring contacts 40 arranged in a pair of groups 41, 41. The groups of contacts are tapped along resistors 42, 42 arranged in circuits 43, 43 of the field elements of the generator of the motor-generator set. An actuator 45 is arranged between the groups of contacts for movement in opposite directions from central position to engage and disengage the contacts for varying the voltages in the circuits differentially in opposite directions to obtain differential field control of the generator in opposite directions and consequent operation of the motor 12 in a direction and at a speed determined by the direction and extent of contact operation. The actuator is operatively connected to the torque or lever member so that the contacts are engaged and disengaged in response to angular deviation of the body member or turret about the mounting axis.

Preferably, the actuator 45 is carried by one end of a lever 46 fulcrumed, at 47, with respect to the standard 39 about an axis parallel to the mounting axis and having its other end coupled to the torque or lever member 16 by means providing a slidable pivot connection. As shown, the torque or lever member is equipped with a coupling member 48 having guide elements 49, 49 between which the adjacent end of the lever 46 is operable. The coupling member 48 is adjustably mounted on the lever member to vary the radial distance thereof from the torque axis.

A spring 50 is held compressed between an outer abutment 51 carried by the standard and an inner abutment 52 formed by a collar provided on the lever 46 and coaxial with its fulcrum axis. With the lever in central position, the spring is positioned so that the moment arm of its force is zero, but, with the least departure from center, the spring acts in a snap-over manner, the moment arm thereof increasing as the extent of departure increases. It will be apparent that, with the lever member and the lever connected and mounted as shown, the spring 50 is effective to exert force on the abutment 45 in opposed relation to the resisting force of the leaf spring contacts 40 exerted thereon; and, as such opposing force increases as the leaf spring force increases, the leaf spring force may be substantially neutralized, with the result that the moment thereof exerted on the gyro about the torque axis may be reduced to a minimum. If the spring torque exerted on the gyro could be reduced to zero, then there would be no need for friction damping; however, practically, there is such torque and the damper serves the useful purpose of damping precessional oscillations.

As effectiveness of the gyro to set up the reference plane depends upon the cosine of the angle of the spin axis to the centered position of the latter, it will be apparent that it is desirable to limit the extent of precessional movement away from the centered position. Therefore, any suitable means may be employed for limiting the extent of precessional movement to an angle not exceeding forty-five degrees. As shown, the inner frame is formed with abutment surfaces 54, 54 which limit the extent of movement. In addition, there is provided caging mechanism automatically operative to restore the gyro to centered position in the event of departure thereof therefrom to a predetermined extent.

Referring to the caging mechanism, the inner frame 30 of the gyro has a pair of pins 56 which are tangent to a plane normal to the spin axis. A pair of lever members 57, 57 are pivotally mounted on the outer frame structure of the gyro and each lever member is equipped with an abutment 58. Normally, the lever members are biased to a disengaged or out-of-the-way position by springs 59, 59 and they are movable against the force of the springs to caging position in which the surfaces of the abutments 58 define a plane normal to the spin axis with the latter normal to the torque axis. Preferably, the levers are moved to caging position by means of magnets 60, 60.

A normally open limit switch 62 is positioned for operation by pins 63 of the inner frame as the stops are approached. Upon closure of the limit switch, a relay, at 64, is rendered effective to close the switch 65 in energizing circuit 66 for the magnets 60, 60 and also to open a switch 67 in the field circuits 43, 43, thereby rendering the power means ineffective during the time that the caging operation is taking place. As the gyro is restored to centered position, a centering switch 68 is rendered effective to interrupt the magnet circuits so that the caging levers may be restored to ineffective position and to restore the generator fields for control by the gyro.

To traverse the turret or body member 11 rapidly in azimuth, one or more slewing switches, at 70, may be provided. Each such switch is movable from mid-position in opposite directions to energize the motor means 12 for rapid traverse movement of the body member or turret in opposite directions about the mounting axis. Incident to establishment of energizing circuits of the motor means for operation in this manner, the switch also establishes circuits to operate the caging mechanism. Upon slewing to the extent desired, the switch, at 70, is restored to mid or open position, whereupon the caging mechanism is released.

The flexible shaft 26 for azimuth adjustment is operated by a handwheel 72; and the handwheel is preferably movable to open a switch 73 in the return side of the field circuits 43, 43 before operation thereof for azimuth adjustment.

From the foregoing, it will be apparent that the torque and spin axes of the gyro define a reference plane positioning the torque member about the torque axis and that relative angular movement of the torque member and of the body member or turret controls the variable means for operation of the motor or power means to restore the body member or turret to a predetermined position about the mounting axis and relative to the reference plane in the event of departure thereof from the latter. Preferably, the gyro is mounted on the body member or turret by means of structure which is adjustable to provide for automatic control of the position of the turret or body member at any location in azimuth, this adjustment preferably being made by operation of the means which connects the mounting to the body member for angular movement with the latter about the mounting axis. As the gyro is a neutral one and as its operation to perform its reference function necessitates precessional movement, it is desirable not only to limit the precessional movement but to effect return to centered position whenever required.

Therefore, in addition to stops for limiting positively the extent of precessional movement, caging mechanism is rendered effective as the stops are approached to restore the gyro to centered position, the caging operation incidentally also involving disconnection of the power means while the caging operation is taking place. As the gyro is brought back to centered position, centering switch means becomes effective to restore the caging mechanism to disengaged position and to restore the power means for control by the gyro.

The turret may be adjusted in azimuth by operation of the handwheel 72. Rapid slewing of the turret may be effected by operation of the switch, at 70, to directly connect the field element 20 or 21 to the supply line, the casing mechanism being rendered effective at the same time to hold the gyro in centered position while traverse is taking place.

While the invention has been shown in but one form, it will be obvious to those skilled in the art that it is not so limited, but is susceptible of various changes and modifications without departing from the spirit thereof.

What is claimed is:

1. In a servo-motor system including a motor for positioning a body member about a mounting axis, a neutral gyro including an inner frame, a rotor journaled in the inner frame, an outer frame structure mounted to move angularly with the body member as the latter moves about the mounting axis, and a gimbal ring pivotally supporting the inner frame about a precession axis and pivotally supported from the outer frame structure about a torque axis; said torque axis being arranged parallel to the body member mounting axis and extending transversely of the rotor spin axis and said precession axis being at right angles both to the torque axis and to the rotor spin axis; said gyro precessing to develop gyroscopic torque about the torque axis opposing motion about the latter, whereby the torque and spin axes provide a reference plane; a member operatively connected to the gyro so as to be positioned by the reference plane; and pick-off means carried by the outer frame structure and operable in response to angular movement of the latter about the torque axis and relative to the last-named member for controlling the input of energy medium to the motor for operation of the latter to maintain the body member positioned about the mounting axis by the reference plane.

2. In a servo-motor system including a motor for positioning a body member about a mounting axis, a neutral gyro including an inner frame, a rotor journaled in the inner frame, an outer frame structure mounted to move angularly with the body member as the latter moves about the mounting axis, and a gimbal ring pivotally supporting the inner frame about a precession axis and pivotally supported from the outer frame structure about a torque axis; said torque axis being arranged parallel to the body member mounting axis and extending transversely of the rotor spin axis and said precession axis being at right angles both to the torque axis and to the rotor spin axis; a torque member pivotally supported from the outer frame structure about the torque axis; a coupling between the torque member and the inner frame, effective about the torque axis; said coupling comprising elements provided with surfaces disposed to accommodate movement of the inner frame and the rotor about the precession axis and which are engageable for torque transmission about the torque axis and for the development of friction effective about the precession axis to damp precessional oscillations; said gyro precessing to develop gyroscopic torque about the torque axis opposing motion about the latter, whereby the torque and spin axes provide a reference plane and said coupling serving to maintain the torque member positioned with respect to the reference plane; and pick-off means carried by the outer frame structure and operable in response to angular movement of the latter about the torque axis and relative to the torque member for controlling the input of energy medium to the motor for operation of the latter to maintain the body member positioned by the reference plane.

3. In a servo-motor system including a motor for positioning a body member about a mounting axis, a neutral gyro including an inner frame, a rotor journaled in the inner frame, an outer frame structure mounted to move angularly with the body member as the latter moves about the mounting axis, and a gimbal ring pivotally supporting the inner frame about a precession axis and pivotally supported from the outer frame structure about a torque axis; said torque axis being arranged parallel to the body member mounting axis and extending transversely of the rotor spin axis and said precession axis being at right angles both to the torque axis and to the rotor spin axis; a torque member pivotally supported from the outer frame structure about the torque axis; a coupling between the torque member and the inner frame and effective about the torque axis; said coupling comprising elements provided with surfaces disposed to accommodate movement of the inner frame and the rotor about the precession axis and which are engageable for torque transmission about the torque axis and for the development of friction effective about the precession axis to damp precessional oscillations; said gyro precessing to develop gyroscopic torque about the torque axis opposing motion about the latter, whereby the torque and spin axes provide a reference plane and said coupling serving to maintain the torque member positioned with respect to the reference plane; pick-off means carried by the outer frame structure and operable in response to angular movement of the latter about the torque axis and relative to the torque member for controlling the input of energy medium to the motor for operation of the latter to maintain the body member positioned by the reference plane; caging mechanism for restoring the inner frame and the rotor to a centered position with the spin axis normal to the torque axis; and means responsive to movement of the inner frame from centered position and about the precession axis to a predetermined extent to render the caging mechanism effective.

4. In a servo-motor system including a motor for positioning a body member about a mounting axis, a neutral gyro including an inner frame, a rotor journaled in the inner frame, an outer frame structure mounted to move angularly with the body member as the latter moves about the mounting axis, and a gimbal ring pivotally supporting the inner frame about a precession axis and pivotally supported from the outer frame structure about a torque axis; said torque axis being arranged parallel to the body member mounting axis and extending transversely of the rotor spin axis and said precession axis being at right angles both to the torque axis and to the rotor spin axis; a torque member pivotally supported from the outer frame structure about the torque axis; a coupling between the torque member and the inner frame and effective about the torque axis; said coupling comprising elements provided with surfaces disposed to accommodate movement of the inner frame and the rotor about the precession axis and which are engageable for torque transmission about the torque axis and for the development of friction effective about the precession axis to damp precessional oscillations; said gyro precessing to develop gyroscopic torque about the torque axis opposing motion about the latter, whereby the torque and spin axes provide a reference plane, and said coupling serving to maintain the torque member positioned with respect to the reference plane; pick-off means carried by the outer frame structure and operable in response to angular movement of the latter about the torque axis and relative to the torque member for controlling the input of energy medium to the motor for operation of the latter to maintain the body member positioned by the reference plane; caging mechanism for restoring the inner frame and the rotor to a centered position with the spin axis normal to the torque axis; means responsive to movement of the inner frame from centered position and about the precession axis to a predetermined extent to render the caging mechanism effective and to interrupt the supply of energy medium to the motor; and means responsive to centering of the inner frame to render the caging mechanism ineffective and to restore the supply of energy medium to the motor.

5. In a servo-motor system including a motor for positioning a body member about a mounting axis, a neutral gyro including an inner frame, a rotor journaled in the inner frame, an outer frame structure mounted to move angularly with the body member as the latter moves about the mounting axis, and a gimbal ring pivotally supporting the inner frame about a precession axis and pivotally supported from the outer frame structure about a torque axis; said torque axis being arranged parallel to the body member mounting axis and extending transversely of the rotor spin axis and said precession axis being at right angles both to the torque axis and to the rotor spin axis; a torque member pivotally supported from the outer frame structure about the torque axis; a coupling between the torque member and the inner frame and effective about the torque axis; said coupling comprising elements provided with surfaces disposed to accommodate movement of the inner frame and the rotor about the precession axis and which are engageable for torque transmission about the torque axis and for the development of friction effective about the precession axis to damp precessional oscillations; said gyro precessing to develop gyroscopic torque about the torque axis opposing motion about the latter, whereby the torque and spin axes provide a reference plane, and said coupling serving to maintain the torque member positioned with respect to the reference plane; pick-off means carried by the outer frame structure and operable in response to angular movement of the latter about the torque axis and relative to the torque member for controlling the input of energy medium to the motor for operation of the latter to maintain the body member positioned by the reference plane; said inner frame having abutment means defining a plane normal to the rotor spin axis; caging mechanism including abutment members carried by and movable relative to the outer frame, normally disengaged from said abutment means, and which are movable to engage the latter to restore the inner frame and the rotor to central position in which the rotor spin axis is at right angles to the torque axis; and means responsive to a predetermined extent of precessional movement of the inner frame and rotor to either side of central position to effect operation of the caging mechanism to restore the inner frame and rotor to central position.

6. In a servo-motor system including a motor for positioning a body member about a mounting axis, a neutral gyro including an inner frame, a rotor journaled in the inner frame, an outer frame structure connected to move angularly with said body member as the latter moves about the mounting axis, and a gimbal ring pivotally supporting the inner frame about a precession axis and pivotally supported from the outer frame about a torque axis; said torque axis being parallel to the body member mounting axis and extending transversely of the rotor spin axis and said precession axis being at right angles both to the torque axis and to the rotor spin axis; a torque member pivotally supported from the outer frame structure about the torque axis; a coupling between the torque member and the inner frame and effective about the torque axis; said coupling comprising elements carried by the torque member and by the inner frame and provided with surfaces disposed to accommodate movement of the inner frame and the rotor about the precession axis and which are engageable for torque transmission about the torque axis and for the development of friction about the precession axis to damp precessional oscillations of the inner frame and the rotor; and means responsive to angular movement of the outer frame structure relative to the torque member and about the torque axis to control the input of energy medium to the motor to drive the body member so as to minimize such relative angular movement; said last-named means including a pair of groups of self-opening leaf spring contacts mounted on the outer frame structure and which are engageable and disengageable to control the supply of energy medium to said motor, a lever pivotally mounted on the outer frame structure about an axis parallel to the torque axis and having one end provided with an abutment disposed between the groups of contacts for operation of the latter, a coupling member carried by the torque member and cooperating with the lever to provide a slidable pivot connection with respect to the latter, and spring means acting on the lever so that its moment arm with respect to the mounting axis of the latter is substantially zero when the lever is in central position and so that such moment arm increases as the lever moves from central position to provide force which opposes the lever spring force and which increases as the contact spring force increases to minimize the moment of the lever spring force applied by the torque member to the gyro about the torque axis.

CLINTON R. HANNA.
LAWRENCE B. LYNN.

REFERENCES CITED

The following references are of record in the file of this patent:

UNITED STATES PATENTS

| Number | Name | Date |
|---|---|---|
| 1,679,354 | Fairchild et al. | Aug. 7, 1928 |
| 1,731,776 | Henry | Oct. 15, 1929 |
| 2,385,203 | Hanna et al. | Sept. 18, 1945 |
| 2,385,204 | Hanna | Sept. 18, 1945 |
| 2,393,124 | Smith | Jan. 15, 1946 |